(12) United States Patent
Park et al.

(10) Patent No.: US 10,766,352 B2
(45) Date of Patent: Sep. 8, 2020

(54) POWER TRANSMISSION APPARATUS FOR A VEHICLE

(71) Applicants: HYUNDAI MOTOR COMPANY, Seoul (KR); KIA MOTORS CORPORATION, Seoul (KR)

(72) Inventors: Juhyeon Park, Suwon-si (KR); Yong Uk Shin, Suwon-si (KR); Seongwook Ji, Gunpo-si (KR); Wonmin Cho, Hwaseong-si (KR); Hyun Sik Kwon, Seoul (KR); Ilhan Yoo, Jeollanam-do (KR); Seong Wook Hwang, Gunpo-si (KR); Ki Tae Kim, Incheon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 41 days.

(21) Appl. No.: 16/185,332

(22) Filed: Nov. 9, 2018

(65) Prior Publication Data
US 2020/0047603 A1    Feb. 13, 2020

(30) Foreign Application Priority Data
Aug. 7, 2018  (KR) .......................... 10-2018-0091541

(51) Int. Cl.
*B60K 6/48*    (2007.10)
*B60K 6/547*   (2007.10)
(Continued)

(52) U.S. Cl.
CPC .............. *B60K 6/547* (2013.01); *B60K 6/365* (2013.01); *B60K 6/48* (2013.01); *F16H 3/093* (2013.01);
(Continued)

(58) Field of Classification Search
CPC .......... B60K 6/547; B60K 6/365; B60K 6/48; B60K 2006/4825; F16H 37/0826;
(Continued)

(56) References Cited

U.S. PATENT DOCUMENTS 7,575,529 B2 * 8/2009 Holmes .................. B60K 6/365
                                                      475/5
8,323,142 B2   12/2012 Masumoto
(Continued)

FOREIGN PATENT DOCUMENTS

EP         3121483 A1    1/2017

*Primary Examiner* — David J Hlavka
(74) *Attorney, Agent, or Firm* — Brinks Gilson & Lione

(57) ABSTRACT

A power transmission apparatus for a vehicle may include: first, second, and third input shafts disposed coaxially with each other and each selectively connected with a motor/generator; a torque mediating shaft disposed coaxially with the first input shaft; a first intermediate shaft in parallel with the first input shaft; a second intermediate shaft in parallel with the first input shaft, and selectively connected with a transmission housing; a first shifting section including five gear sets, selectively receiving torques through the first and third input shafts, and providing intermediate shift-stages; and a second shifting section including a planetary gear set, forming an output torque by combination of torques from the first shifting section and the second input shaft, and outputting the output torque to the output shaft through one gear set.

10 Claims, 2 Drawing Sheets

Figure 1:
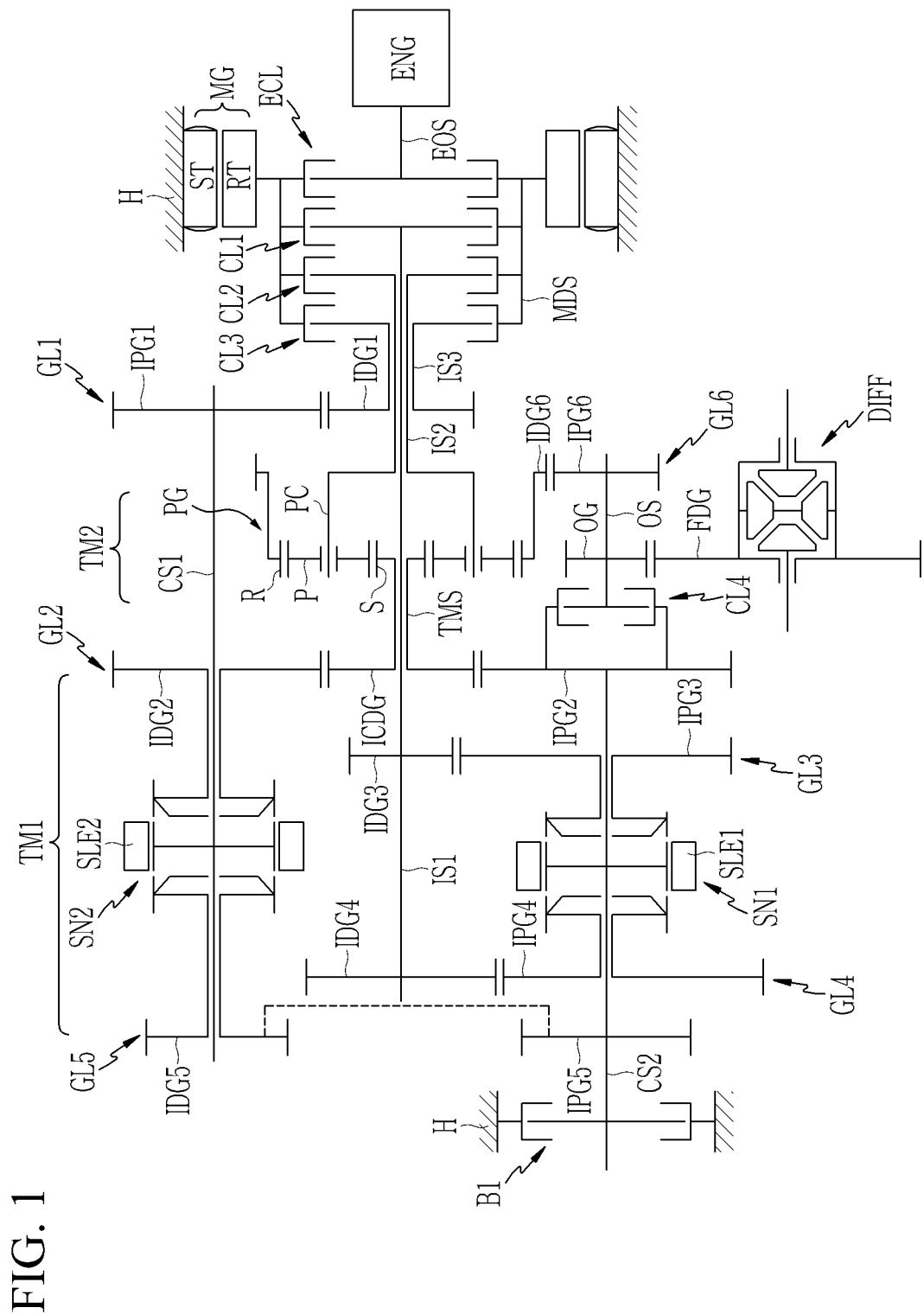

(51) Int. Cl.
  *F16H 37/08*   (2006.01)
  *F16H 3/093*   (2006.01)
  *F16H 3/54*    (2006.01)
  *B60K 6/365*   (2007.10)
  *F16H 3/72*    (2006.01)

(52) U.S. Cl.
  CPC ............... *F16H 3/54* (2013.01); *F16H 3/724* (2013.01); *F16H 37/0826* (2013.01); *B60K 2006/4825* (2013.01); *B60Y 2200/92* (2013.01); *F16H 2200/0065* (2013.01)

(58) Field of Classification Search
  CPC . F16H 3/093; F16H 3/54; F16H 3/724; F16H 2200/0065; B60Y 2200/92
  See application file for complete search history.

(56) References Cited

U.S. PATENT DOCUMENTS

| | | | |
|---|---|---|---|
| 8,506,450 B2 * | 8/2013 | Nakasako | B60K 6/36 477/5 |
| 2013/0031990 A1 | 2/2013 | Singh et al. | |

* cited by examiner

FIG. 2

| | Shift-stage | ECL | CL1 | CL2 | CL3 | CL4 | B1 | SN1 | | | SN2 | | |
|---|---|---|---|---|---|---|---|---|---|---|---|---|---|
| | | | | | | | | IPG3 | N | IPG4 | IDG2 | N | IDG5 |
| engine and Parallel mode | REV | ● | | | ● | ● | | ○ | ● | ○ | | | ● |
| | FD1 | ● | ● | | | ● | | ● | | | ○ | ● | ○ |
| | FD2 | ● | | | ● | ● | | ○ | ● | ○ | ● | | |
| | FD3 | ● | ● | | | ● | | | | ● | ○ | ● | ○ |
| | FD4 | ● | | ● | | ● | | ○ | ● | ○ | ○ | ● | ○ |
| | FD5 | ● | ● | ● | | | | | | ● | ○ | ● | ○ |
| | FD6 | ● | | ● | ● | | | ○ | ● | ○ | ● | | |
| | FD7 | ● | ● | ● | | | | ● | | | ○ | ● | ○ |
| | FD8 | ● | | ● | | | ● | ○ | ● | ○ | ○ | ● | ○ |
| | FD9 | ● | | ● | ● | | | ○ | ● | ○ | | | ● |
| EV mode | REV | | | | ● | ● | | ○ | ● | ○ | | | ● |
| | FD1 | | ● | | | ● | | ● | | | ○ | ● | ○ |
| | FD2 | | | | ● | ● | | ○ | ● | ○ | ● | | |
| | FD3 | | ● | | | ● | | | | ● | ○ | ● | ○ |
| | FD4 | | | ● | | ● | | ○ | ● | ○ | ○ | ● | ○ |
| | FD5 | | ● | ● | | | | | | ● | ○ | ● | ○ |
| | FD6 | | | ● | ● | | | ○ | ● | ○ | ● | | |
| | FD7 | | ● | ● | | | | ● | | | ○ | ● | ○ |
| | FD8 | | | ● | | | ● | ○ | ● | ○ | ○ | ● | ○ |
| | FD9 | | | ● | ● | | | ○ | ● | ○ | | | ● |

○ : Preliminary engagement available

POWER TRANSMISSION APPARATUS FOR A VEHICLE

CROSS-REFERENCE TO RELATED APPLICATION

This application claims priority to and the benefit of Korean Patent Application No. 10-2018-0091541, filed on Aug. 7, 2018, the entire contents of which are incorporated herein by reference.

FIELD

The present disclosure relates to a power transmission apparatus for a vehicle.

BACKGROUND

The statements in this section merely provide background information related to the present disclosure and may not constitute prior art.

An environmentally-friendly technology of a vehicle is a core technology which controls survival of a future automobile industry, and advanced car makers have focused on the development of an environmentally-friendly vehicle to comply with regulations for environment and fuel efficiency.

An electric vehicle (EV) or a hybrid electric vehicle (HEV) that utilizes electrical energy, or a double clutch transmission (DCT) improving efficiency and convenience of a transmission may be examples of such future vehicle technology.

The double clutch transmission (DCT) includes two clutches devices and a gear train of a basically manual transmission, selectively transmits a torque input from an engine to two input shafts by using the two clutches devices, and outputs a torque shifted by the gear train.

Such a double clutch transmission (DCT) attempts to compactly realize a multi-stage transmission of more than five speeds. The DCT achieves an automated manual transmission (AMT) that removes the inconvenience of a manual shifting of a driver, by controlling two clutches and synchronizing devices by a controller.

In comparison with an automatic transmission using planetary gears, such a DCT shows merits, such as higher efficiency in power delivery, easier modification in revising or adding parts in order to achieve more shift-stages, etc., and thus gathers more spotlight since it can more comfortably conform to fuel consumption regulations and efficiency in achieving more shift-stages.

The above information disclosed in this Background section is only for enhancement of understanding of the background of the present disclosure and therefore it may contain information that does not form the prior art that is already known to a person of ordinary skill in the art.

SUMMARY

The present disclosure provides a power transmission apparatus for a vehicle having an advantage of achieving shift-stages in an electric vehicle mode and in a parallel hybrid mode by employing a simple arrangement of a planetary gear set and a motor/generator to a double clutch scheme, thereby improving fuel consumption and better applicability to a hybrid vehicle.

An exemplary power transmission apparatus is for a vehicle having an engine and a motor/generator. The power transmission apparatus may include: a first input, a second input shaft, a third input shaft, a torque mediating shaft, a first intermediate shaft, a second intermediate shaft, a first shifting section, a second shifting section, and an output shaft. The first input shaft may be selectively connected with the motor/generator. The second input shaft may be formed as a hollow shaft, disposed coaxial with and external to the first input shaft without rotational interference, and selectively connected with the motor/generator. The third input shaft may be formed as a hollow shaft, disposed coaxial with and external to the second input shaft without rotational interference, and selectively connected with the motor/generator. The torque mediating shaft may be formed as a hollow shaft disposed coaxial with and external to the first input shaft without rotational interference. The first intermediate shaft may be disposed in parallel with the first input shaft. The second intermediate shaft may be disposed in parallel with the first input shaft, and selectively connected with a transmission housing. The first shifting section may include five gear sets (i.e., a first gear set, a second gear set, a third gear set, a fourth gear set, and a fifth gear set) disposed on the first and third input shafts, the first and second intermediate shafts, and the torque mediating shaft. The first shifting section may selectively receive torque through the first and third input shafts and provide a plurality of intermediate shift-stages shifted from the received torque. The second shifting section may include a planetary gear set having a sun gear fixedly connected with the torque mediating shaft, form an output torque by combination of a torque selectively transmitted from the first shifting section and a torque selectively input through the second input shaft, and output the output torque to the output shaft through the one gear set selected among the first, second, third, fourth and fifth gear sets of the first shifting section. The output shaft may be disposed coaxially with and selectively connected with the second intermediate shaft and output a torque received from the first and second shifting sections.

The first gear set may include a first drive gear fixedly connected with the third input shaft and a first driven gear fixedly connected with the first intermediate shaft and externally gear-meshed with the first drive gear. The second gear set may include a second drive gear disposed coaxial with and external to the first intermediate shaft without rotational interference, an intermediate gear fixedly connected with the torque mediating shaft and externally gear-meshed with the second drive gear, and a second driven gear fixedly connected with the second intermediate shaft and externally gear-meshed with the intermediate gear. The third gear set may include a third drive gear fixedly connected with the first input shaft, and a third driven gear rotatably disposed on an external circumference of the second intermediate shaft without rotational interference and externally gear-meshed with the third drive gear. The fourth gear set may include a fourth drive gear fixedly connected with the first input shaft, and a fourth driven gear rotatably disposed on an external circumference of the second intermediate shaft without rotational interference and externally gear-meshed with the fourth drive gear. The fifth gear set may include a fifth drive gear disposed coaxial with and external to the first intermediate shaft without rotational interference, and a fifth driven gear fixedly connected with the second intermediate shaft and externally gear-meshed with the fifth drive gear.

The third driven gear and the fourth driven gear are selectively connected with the second intermediate shaft through a first synchronizer; and The second drive gear and the fifth drive gear are selectively connected with the first intermediate shaft through a second synchronizer.

Gear ratios of the first gear set and the second gear set may be used for realizing the forward second speed and the forward sixth speed. A gear ratio of the third gear set may be used for realizing the forward first speed and the forward seventh speed. A gear ratio of the fourth gear set may be used for realizing the forward third speed and the forward fifth speed. A gear ratio of the fifth gear set may be used for realizing the forward ninth speed and the reverse speed in cooperation with the gear ratio of the first gear set.

A sun gear of the planetary gear set may be fixedly connected with the torque mediating shaft. A planet carrier of the planetary gear set may be fixedly connected with the second input shaft. A ring gear of the planetary gear set may be externally gear-meshed with the output shaft through the sixth gear set.

The sixth gear set may include a sixth drive gear fixedly connected with the ring gear of the planetary gear set, and a sixth driven gear fixedly connected with the output shaft and externally gear-meshed with the sixth drive gear.

The planetary gear set may be a single pinion planetary gear set.

The power transmission apparatus may further include five clutches each selectively connecting a corresponding pair among the first, second and third input shafts, the torque mediating shaft, and the first and second intermediate shafts, and a brake selectively connecting a corresponding shaft selected among the first, second and third input shafts, the torque mediating shaft, and the first and second intermediate shafts to the transmission housing.

The five clutches may include an engine clutch arranged between an engine output shaft of the engine and a motor shaft of the motor/generator, a first clutch arranged between the motor shaft and the first input shaft, a second clutch arranged between the motor shaft and the second input shaft, a third clutch arranged between the motor shaft and the third input shaft, and a fourth clutch arranged between the second intermediate shaft and the output shaft. The brake may be arranged between the second intermediate shaft and the transmission housing.

The first and second shifting sections may be disposed in the order of the second shifting section and the first shifting section from the engine.

A power transmission apparatus for a vehicle according to an exemplary form of the present disclosure realizes shift-stages of nine forward speeds and one reverse speed by employing a planetary gear set and two synchronizers to a multiple clutch transmission, thereby enabling multiple shift-stages by a simplified arrangement, improving installability, and reducing an overall weight.

In addition, an exemplary form of the present disclosure may receive torque from a motor/generator as well as an engine, such that a vehicle may be driving in an electric vehicle mode and parallel hybrid mode, thereby improving fuel consumption.

Further, effects that can be obtained or expected from exemplary forms of the present disclosure are directly or suggestively described in the following detailed description. That is, various effects expected from exemplary forms of the present disclosure will be described in the following detailed description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a schematic view of a power transmission apparatus for a vehicle according to an exemplary form of the present disclosure; and FIG. 2 is a shifting operational chart of a power transmission apparatus for a vehicle according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As those skilled in the art would realize, the described forms may be modified in various different ways, all without departing from the spirit or scope of the present disclosure.

In the following description, dividing names of components into first, second and the like is to divide the names because the names of the components are the same as each other and an order thereof is not particularly limited.

FIG. 1 is a schematic view of a power transmission apparatus for a vehicle according to an exemplary form of the present disclosure.

Referring to FIG. 1, a power transmission apparatus shifts torques of an engine ENG as a primary power source and a motor/generator MG as an auxiliary power source, and includes first, second, and third input shafts IS1, IS2, and IS3, a torque mediating shaft TMS, first and second intermediate shafts CS1 and CS2, first and second shifting sections TM1 and TM2, and an output shaft OS.

The engine ENG is a primary power source and a variety of typical engines such as a gasoline engine or a diesel engine that uses fossil fuel may be used as the engine ENG.

The motor/generator MG as an auxiliary power source may act as a motor and also as a generator, and includes a stator ST and a rotor RT, where the stator ST is fixed to the transmission housing H and the rotor RT is rotatably supported within the stator ST.

Torques from the engine ENG and/or the motor/generator MG are supplied to the first shifting section TM1, and a plurality of intermediate shift-stages are formed at the first shifting section TM1 by the supplied torques. Receiving a torque from the first shifting section TM1 and selectively receiving a torque from the engine ENG through the second input shaft IS2, the second shifting section TM2 performs shifting operation and outputs a shifted torque through the output shaft OS.

The first, second, and third input shafts IS1, IS2, and IS3 and the torque mediating shaft TMS are disposed on a same axis. The first and second intermediate shafts CS1 and CS2 and the output shaft OS are disposed in parallel with the first input shaft IS1. The second intermediate shaft CS2 and the output shaft OS are disposed on a same axis and selectively interconnected with each other.

The motor/generator MG is disposed to be rear of the engine ENG. A motor shaft MDS fixedly connected with the rotor RT of the motor/generator MG is selectively connected with an output shaft EOS of the engine ENG interposing an engine clutch ECL.

The first input shaft IS1 is selectively connected with the motor shaft MDS. The first input shaft IS1 delivers torques from the engine ENG and the motor/generator MG to the first shifting section TM1

The second input shaft IS2 is formed as a hollow shaft and disposed coaxial with and external to the first input shaft IS1 without rotational interference, and selectively connected with the motor shaft MDS thereby selectively transmitting torques of the engine ENG and the motor/generator MG to the second shifting section TM2.

The third input shaft IS3 is formed as a hollow shaft and disposed coaxial with and external to the second input shaft IS2 without rotational interference, and selectively connected with the motor shaft MDS thereby transmitting the torques of the engine ENG and the motor/generator MG to the first shifting section TM1.

The torque mediating shaft TMS is formed as a hollow shaft and disposed coaxial with and external to the first input shaft IS1.

The second intermediate shaft CS2 is selectively connected with the transmission housing H through a first brake B1, and may be selectively fixed in a rotating direction.

The first shifting section TM1 includes the first and third input shafts IS1 and IS3, the first and second intermediate shafts CS1 and CS2, and first, second, third, fourth, and fifth gear sets GL1, GL2, GL3, GL4, and GL5 disposed on the torque mediating shaft TMS.

The second shifting section TM2 includes a planetary gear set PG. The planetary gear set PG is a single pinion planetary gear set, and includes a sun gear S, a planet carrier PC rotatably supporting a plurality of pinion gears P externally gear-meshed with the sun gear S, and a ring gear R internally gear-meshed with the plurality of pinion gears P.

The planetary gear set PG is arranged between the second input shaft IS2 and the torque mediating shaft TMS. The sun gear S is fixedly connected with the torque mediating shaft TMS. The planet carrier PC is fixedly connected with the second input shaft IS2. The ring gear R is externally gear-meshed with the output shaft OS through sixth gear set GL6.

The first gear set GL1 includes a first drive gear IDG1 fixedly connected with the third input shaft IS3, and a first driven gear IPG1 fixedly connected with the first intermediate shaft CS1 and externally gear-meshed with the first drive gear IDG1.

The second gear set GL2 includes a second drive gear IDG2 rotatably disposed on an external circumference of the first intermediate shaft CS without rotational interference, an intermediate gear ICDG fixedly connected with the torque mediating shaft TMS and externally gear-meshed with the second drive gear IDG2, and a second driven gear IPG2 fixedly connected with the second intermediate shaft CS2 and externally gear-meshed with the intermediate gear ICDG.

The third gear set GL3 includes a third drive gear IDG3 fixedly connected with the first input shaft IS1, a third driven gear IPG3 rotatably disposed on an external circumference of the second intermediate shaft CS2 without rotational interference and externally gear-meshed with the third drive gear IDG3.

The fourth gear set GL4 includes a fourth drive gear IDG4 fixedly connected with the first input shaft IS1, a fourth driven gear IPG4 rotatably disposed on an external circumference of the second intermediate shaft CS2 without rotational interference and externally gear-meshed with the fourth drive gear IDG4.

The fifth gear set GL5 includes a fifth drive gear IDG5 rotatably disposed on an external circumference of the first intermediate shaft CS1 without rotational interference, and a fifth driven gear IPG5 fixedly connected with the second intermediate shaft CS2 and externally gear-meshed with the fifth drive gear IDG5.

The sixth gear set GL6 includes a sixth drive gear IDG6 fixedly connected with the ring gear R of the planetary gear set PG, and a sixth driven gear IPG6 fixedly connected with the output shaft OS and externally gear-meshed with the sixth drive gear IDG6.

The third driven gear IPG3 and the fourth driven gear IPG4 selectively connected to the second intermediate shaft CS2 by a first synchronizer SN1.

The second drive gear IDG2 and the fifth drive gear IDG5 selectively connected to the first intermediate shaft CS1 by a second synchronizer SN2.

Gear ratios between drive and driven gears of the first, second, third, fourth, and fifth gear sets GL1, GL2, GL3, GL4, GL5, and GL6 may be appropriately set in consideration of transmission requirements. The gear ratios of the first gear set GL1 and the second gear set GL2 are used for realizing the forward second speed and the forward sixth speed. The gear ratio of the third gear set GL3 is used for realizing the forward first speed and the forward seventh speed. The gear ratio of the fourth gear set GL4 is used for realizing the forward third speed and the forward fifth speed. The gear ratio of the fifth gear set GL5 is used for realizing the forward ninth speed and the reverse speed in cooperation with the gear ratio of the first gear set GL1.

The output shaft OS is an output member, and by receiving torques input from the second intermediate shaft CS2 and from the sixth gear set GL6, transmits the received torque to a differential DIFF through the output gear OG and the final reduction gear FDG.

In addition, five engagement elements of an engine clutch ECL and first to fourth clutches CL1, CL2, CL3, and CL4 are disposed between rotating members such as various shafts, and one engagement element of a brake B1 is disposed between a rotating member and the transmission housing H.

The engine clutch ECL is arranged between the engine output shaft EOS (e.g., engine crankshaft) and the motor shaft MDS, and selectively interconnects the engine output shaft EOS and the motor shaft MDS.

The first clutch CL1 is arranged between the motor shaft MDS and the first input shaft IS1, and selectively connects the motor shaft MDS and the first input shaft IS1.

The second clutch CL2 is arranged between the motor shaft MDS and the second input shaft IS2, and selectively connects the motor shaft MDS and the second input shaft IS2.

The third clutch CL3 is arranged between the motor shaft MDS and the third input shaft IS3, and selectively connects the motor shaft MDS and the third input shaft IS3.

The fourth clutch CL4 is arranged between the second intermediate shaft CS2 and the output shaft OS, and selectively connects the second intermediate shaft CS2 and the output shaft OS.

The first brake B1 is arranged between the second intermediate shaft CS2 and the transmission housing H, and therefore, the second intermediate shaft CS2 and the idle shaft IDS selectively act as fixed elements.

The engagement elements of the engine clutch ECL, the first to fourth clutches CL1 to CL4, and the first brake B1 may be realized as multi-plate hydraulic pressure friction devices that are frictionally engaged by hydraulic pressure, however, it should not be understood to be limited thereto, since various other configuration that are electrically controllable may be available.

The first and second synchronizers SN1 and SN2 may be formed as a known scheme, and the first and second sleeves SLE1 and SLE2 applied to the first and second synchronizers SN1 and SN2 may be operated by respective actuators (not shown) that may be controlled by a transmission control unit.

According to one form, the second shifting section TM2 is disposed at a rear side of the engine ENG, and the first shifting section TM1 is disposed at a rear side of the second shifting section TM2.

FIG. 2 is a shifting operational chart for a power transmission apparatus for a vehicle according to an exemplary form of the present disclosure, and the power transmission apparatus for a vehicle according to an exemplary form performs shifting operation as follows.

[Engine and Parallel Mode Reverse Speed]

In the engine and parallel mode reverse speed REV, as shown in FIG. 2, the fifth drive gear IDG5 is synchronously connected to the first intermediate shaft CS1 by the operation of the sleeve SLE2 of the second synchronizer SN2, and the engine clutch ECL and the third and fourth clutches CL3 and CL4 are operated.

As a result, by the operation of the engine clutch ECL, the third clutch CL3 and the second synchronizer SN2, the torque of the engine ENG is input to the second intermediate shaft CS2 through the motor shaft MDS, the third input shaft IS3, the first gear set GL1, the second synchronizer SN2, the first intermediate shaft CS1, and the fifth gear set GL5.

Then, the torque received at the second intermediate shaft CS2 is transmitted to the differential DIFF through the output shaft OS by the operation of the fourth clutch CL4, thereby realizing the reverse speed.

[The Engine and Parallel Mode Forward First Speed]

In the engine and parallel mode forward first speed FD1, as shown in FIG. 2, the third driven gear IPG3 is synchronously connected to the second intermediate shaft CS2 by the operation of the sleeve SLE1 of the first synchronizer SN1, and the engine clutch ECL and the first, fourth clutch CL1 and CL4 are operated.

As a result, by the operation of the engine clutch ECL, the first clutch CL1, and the first synchronizer SN1, the torque of the engine ENG is transmitted to the second intermediate shaft CS2 through the motor shaft MDS, the first input shaft IS1, the third gear set GL3, and the first synchronizer SN1.

Then, the torque received at the second intermediate shaft CS2 is transmitted to the differential DIFF through the output shaft OS by the operation of the fourth clutch CL4, thereby realizing the forward first speed.

[The Engine and Parallel Mode Forward Second Speed]

In the engine and parallel mode forward second speed FD2, as shown in FIG. 2, the second drive gear IDG2 is synchronously connected to the first intermediate shaft CS1 by the operation of the sleeve SLE2 of the second synchronizer SN2, and the engine clutch ECL and the third and fourth clutches CL3 and CL4 are operated.

As a result, by the operation of the engine clutch ECL, the third clutch CL3 and the second synchronizer SN2, the torque of the engine ENG is input to the second intermediate shaft CS2 through the motor shaft MDS, the third input shaft IS3, the first gear set GL1, the second synchronizer SN2, the first intermediate shaft CS1, and the second gear set GL2.

Then, the torque received at the second intermediate shaft CS2 is transmitted to the differential DIFF through the output shaft OS by the operation of the fourth clutch CL4, thereby realizing the forward second speed.

[The Engine and Parallel Mode Forward Third Speed]

In the engine and parallel mode forward third speed FD3, as shown in FIG. 2, the fourth driven gear IPG4 is synchronously connected to the second intermediate shaft CS2 by the operation of the sleeve SLE1 of the first synchronizer SN1, and the engine clutch ECL and the first, fourth clutch CL1 and CL4 are operated.

As a result, by the operation of the engine clutch ECL, the first clutch CL1, and the first synchronizer SN1, the torque of the engine ENG is transmitted to the second intermediate shaft CS2 through the motor shaft MDS, the first input shaft IS1, the fourth gear set GL4, and the first synchronizer SN1.

Then, the torque received at the second intermediate shaft CS2 is transmitted to the differential DIFF through the output shaft OS by the operation of the fourth clutch CL4, thereby realizing the forward third speed.

[The Engine and Parallel Mode Forward Fourth Speed]

In the engine and parallel mode forward fourth speed FD4, as shown in FIG. 2, the first and second synchronizers SN1 and SN2 are maintained neutral, and the engine clutch ECL and the second, fourth clutch CL2 and CL4 are operated.

As a result, by the operation of the engine clutch ECL and the second clutch CL2, the torque of the engine ENG is input to the planet carrier PC of the planetary gear set PG through the motor shaft MDS and the second input shaft IS2.

By the operation of the fourth clutch CL4, the sixth gear set GL6, the output shaft OS, the second intermediate shaft CS2, the second gear set GL2, and the torque mediating shaft TMS are interconnected, and thereby the ring gear R connected to the sixth gear set GL6 is connected with the sun gear S connected to the torque mediating shaft TMS. The speed relation between the ring gear R and the sun gear S is formed by the gear ratios of the second and sixth gear sets GL2 and GL6, while the planet carrier PC of the planetary gear set PG receives an input torque through the second input shaft IS2. Therefore, the sun gear S and the ring gear R of the planetary gear set PG rotate at respective speeds satisfying the speed relation while the planet carrier PC rotates at the speed of the second input shaft IS2.

By such a cooperative operation of rotation members of the planetary gear PG, the speed and torque of the output shaft OS connected to the sixth gear set GL6 is determined and transmitted to the differential DIFF through the output shaft OS, thereby realizing the forward fourth speed.

[The Engine and Parallel Mode Forward Fifth Speed]

In the engine and parallel mode forward fifth speed FD5, as shown in FIG. 2, the fourth driven gear IPG4 is synchronously connected to the second intermediate shaft CS2 by the operation of the sleeve SLE1 of the first synchronizer SN1, and the engine clutch ECL and the first and second clutches CL1 and CL2 are operated.

As a result, by the operation of the engine clutch ECL, the first clutch CL1, and the first synchronizer SN1, the torque of the engine ENG is partially input to the sun gear S of the planetary gear set PG through the motor shaft MDS, the first input shaft IS1, the fourth gear set GL4, the first synchronizer SN1, the second intermediate shaft CS2, and the second gear set GL2.

In addition, by the operation of the second clutch CL2, the torque of the engine ENG is partially input to the planet carrier PC of the planetary gear set PG through the motor shaft MDS and the second input shaft IS2.

Then, the planetary gear set PG realizes shifting based on speed difference between the sun gear S and the planet carrier PC, and outputs the shifted torque to the differential DIFF through the output shaft OS, thereby realizing the forward fifth speed.

[The Engine and Parallel Mode Forward Sixth Speed]

In the engine and parallel mode forward sixth speed FD6, as shown in FIG. 2, the second drive gear IDG2 is synchronously connected to the first intermediate shaft CS1 by the operation of the sleeve SLE2 of the second synchronizer SN2, and the engine clutch ECL and the second and third clutches CL2 and CL3 are operated.

As a result, by the operation of the engine clutch ECL and the second clutch CL2, the torque of the engine ENG is partially input to the planet carrier PC of the planetary gear set PG through the motor shaft MDS and the second input shaft IS2.

In addition, by the operation of the third clutch CL3 and the second synchronizer SN2, the torque of the engine ENG is partially input to the sun gear S of the planetary gear set PG through the motor shaft MDS, the third input shaft IS3, the first gear set GL1, the second synchronizer SN2, the first intermediate shaft CS1, and the second gear set GL2.

Then, the planetary gear set PG realizes shifting based on speed difference between the sun gear S and the planet carrier PC, and outputs the shifted torque to the differential DIFF through the output shaft OS, thereby realizing the forward sixth speed.

[The Engine and Parallel Mode Forward Seventh Speed]

In the engine and parallel mode forward seventh speed FD7, as shown in FIG. 2, the third driven gear IPG3 is synchronously connected to the second intermediate shaft CS2 by the operation of the sleeve SLE1 of the first synchronizer SN1, and the engine clutch ECL and the first and second clutches CL1 and CL2 are operated.

As a result, by the operation of the engine clutch ECL, the first clutch CL1, and the first synchronizer SN1, the torque of the engine ENG is partially input to the sun gear S of the planetary gear set PG through the motor shaft MDS, the first input shaft IS1, the third gear set GL3, the and the first synchronizer SN1, the second intermediate shaft OS2, and the second gear set GL2, torque mediating shaft TMS.

In addition, by the operation of the second clutch CL2, the torque of the engine ENG is partially input to the planet carrier PC of the planetary gear set PG through the motor shaft MDS and the second input shaft IS2.

Then, the planetary gear set PG realizes shifting based on speed difference between the sun gear S and the planet carrier PC, and outputs the shifted torque to the differential DIFF through the output shaft OS, thereby realizing the forward seventh speed.

[The Engine and Parallel Mode Forward Eighth Speed]

In the engine and parallel mode forward eighth speed FD8, as shown in FIG. 2, the first and second synchronizers SN1 and SN2 are maintained neutral, and the engine clutch ECL, the second clutch CL2, and the first brake B1 are operated.

As a result, by the operation of the engine clutch ECL and second clutch CL2, the torque of the engine ENG is input to the planet carrier PC of the planetary gear set PG through the motor shaft MDS and the second input shaft IS2, and by the operation of the first brake B1, the sun gear S of the planetary gear set PG acts as a fixed element.

Then, since the planet carrier PC of the planetary gear set planetary gear set PG receives input torque while the sun gear S acts as a fixed element, the planetary gear set planetary gear set PG outputs an increased speed through the ring gear R, and the torque output through the ring gear R is transmitted to the differential DIFF through the sixth gear set GL6 and the output shaft OS, thereby realizing the forward eighth speed.

In such a forward eighth speed, the planetary gear set PG outputs a further increased speed than in the forward seventh speed.

[The Engine and Parallel Mode Forward Ninth Speed]

In the engine and parallel mode forward ninth speed FD9, as shown in FIG. 2, the fifth drive gear IDG5 is synchronously connected to the first intermediate shaft CS1 by the operation of the sleeve SLE2 of the second synchronizer SN2, and the engine clutch ECL and the second and third clutches CL2 and CL3 are operated.

As a result, by the operation of the engine clutch ECL and the second clutch CL2, the torque of the engine ENG is partially input to the planet carrier PC of the planetary gear set PG through the motor shaft MDS and the second input shaft IS2.

In addition, by the operation of the third clutch CL3, the torque of the engine ENG is partially input to the sun gear S of the planetary gear set PG through the motor shaft MDS, the third input shaft IS3, the first gear set GL1, the first intermediate shaft CS1, the second synchronizer SN2, the fourth gear set GL5, the second intermediate shaft CS2, and the second gear set GL2.

Then, the planetary gear set PG outputs a further increased speed than in the forward eighth speed through the ring gear R, and the torque output through the ring gear R is transmitted to the differential DIFF through the sixth gear set GL6 and the output shaft OS, thereby realizing the forward ninth speed.

In such a forward ninth speed, the planetary gear set PG outputs a further increased speed than in the forward eighth speed.

In the above description of the "engine and parallel mode", only the engine ENG is exampled as a power source. However, it may be obviously understood that such shifting operation may be maintained even if the motor/generator MG is activated to form a parallel mode and assist the engine ENG.

An electric vehicle mode EV mode differs from the engine and parallel mode, only in that the engine ENG is stopped while releasing the engine clutch ECL and only the motor/generator MG is used as sole power source. It may be understood that such a difference will not affect the above-described shifting operation, and thus, in such an electric vehicle mode EV mode the same shift-stages of one reverse speed REV and nine forward speeds of the forward first speed FD1 to the forward ninth speed FD9 may be obtained by the same operational chart.

A power transmission apparatus for a vehicle according to an exemplary form of the present disclosure realizes shift-stages of nine forward speeds and one reverse speed by employing a planetary gear set and two synchronizers to a multiple clutch transmission, thereby enabling multiple shift-stages by a simplified arrangement, improving installability, and reducing an overall weight.

In addition, an exemplary form of the present disclosure may receive torque from a motor/generator as well as an engine, such that a vehicle may be driving in an electric vehicle mode and parallel hybrid mode, thereby improving fuel consumption.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

DESCRIPTION OF SYMBOLS

B1: first brake
CL1, CL2, CL3, CL4: first, second, third, and fourth clutches
CS1, CS2: first and second intermediate shafts
ECL: engine clutch
EOS: engine output shaft (crankshaft)
GL1, GL2, GL3, GL4, GL5, GL6: first, second, third, fourth, fifth, and sixth gear sets
ICDG: intermediate gear
IDG1, IDG2, IDG3, IDG4, IDG5, IDG6: first, second, third, fourth, fifth, and sixth drive gears
IPG1, IPG2, IPG3, IPG4, IPG5, IPG6: first, second, third, fourth, fifth, and sixth driven gears
IS1, IS2, IS3: first, second, and third input shafts
MDS: motor shaft
OG: output gear
OS: output shaft
PG: planetary gear set
SN1, SN2: first and second synchronizers
TMS: torque mediating shaft
TM1, TM2: first and second shifting sections

What is claimed is:

1. A power transmission apparatus for a vehicle having an engine and a motor/generator, the power transmission apparatus comprising:
   a first input shaft selectively connected with the motor/generator;
   a second input shaft formed as a hollow shaft, disposed coaxially with and external to the first input shaft without rotational interference, and selectively connected with the motor/generator;
   a third input shaft formed as a hollow shaft, disposed coaxially with and external to the second input shaft without rotational interference, and selectively connected with the motor/generator;
   a torque mediating shaft formed as a hollow shaft disposed coaxially with and external to the first input shaft without rotational interference;
   a first intermediate shaft disposed in parallel with the first input shaft;
   a second intermediate shaft disposed in parallel with the first input shaft, and selectively connected with a transmission housing;
   a first shifting section including a first gear set, a second gear set, a third gear set, a fourth gear set, and a fifth gear set, each of which is disposed on at least one corresponding shaft among the first input shaft, the third input shaft, the first intermediate shaft, the second intermediate shaft, and the torque mediating shaft, where the first shifting section is configured to selectively receive a first torque through the first and third input shafts and to provide a plurality of intermediate shift-stages shifted from the received first torque;
   a second shifting section including a planetary gear set having a sun gear fixedly connected with the torque mediating shaft, forming an output torque by combination of a second torque selectively transmitted from the first shifting section and a third torque selectively input through the second input shaft, the second shifting section configured to output the output torque to an output shaft through one gear set selected among the first, second, third, fourth and fifth gear sets of the first shifting section; and
   wherein the output shaft is disposed coaxially with and selectively connected with the second intermediate shaft and outputs a fourth torque received from the first and second shifting sections.

2. The power transmission apparatus of claim 1, wherein the first gear set includes:
   a first drive gear fixedly connected with the third input shaft; and
   a first driven gear fixedly connected with the first intermediate shaft and externally gear-meshed with the first drive gear,
   wherein the second gear set includes:
   a second drive gear disposed coaxial with and external to the first intermediate shaft without rotational interference;
   an intermediate gear fixedly connected with the torque mediating shaft and externally gear-meshed with the second drive gear; and
   a second driven gear fixedly connected with the second intermediate shaft and externally gear-meshed with the intermediate gear,
   wherein the third gear set includes:
   a third drive gear fixedly connected with the first input shaft; and
   a third driven gear rotatably disposed on an external circumference of the second intermediate shaft without rotational interference and externally gear-meshed with the third drive gear,
   wherein the fourth gear set includes:
   a fourth drive gear fixedly connected with the first input shaft; and
   a fourth driven gear rotatably disposed on an external circumference of the second intermediate shaft without rotational interference and externally gear-meshed with the fourth drive gear, and
   wherein the fifth gear set includes:
   a fifth drive gear disposed coaxial with and external to the first intermediate shaft without rotational interference; and
   a fifth driven gear fixedly connected with the second intermediate shaft and externally gear-meshed with the fifth drive gear.

3. The power transmission apparatus of claim 2, wherein:
   the third driven gear and the fourth driven gear are selectively connected with the second intermediate shaft through a first synchronizer; and
   the second drive gear and the fifth drive gear are selectively connected with the first intermediate shaft through a second synchronizer.

4. The power transmission apparatus of claim 2, wherein:
   gear ratios of the first gear set and the second gear set are configured to provide a forward second speed and a forward sixth speed;
   a gear ratio of the third gear set is configured to provide a forward first speed and a forward seventh speed;
   a gear ratio of the fourth gear set is configured to provide a forward third speed and a forward fifth speed; and
   a gear ratio of the fifth gear set is configured to provide a forward ninth speed and a reverse speed in cooperation with the gear ratio of the first gear set.

5. The power transmission apparatus of claim 1, wherein:
   the sun gear of the planetary gear set is fixedly connected with the torque mediating shaft;

a planet carrier of the planetary gear set is fixedly connected with the second input shaft; and a ring gear of the planetary gear set is externally gear-meshed with the output shaft through a sixth gear set.

6. The power transmission apparatus of claim 5, wherein the sixth gear set comprises:

a sixth drive gear fixedly connected with the ring gear of the planetary gear set; and a sixth driven gear fixedly connected with the output shaft and externally gear-meshed with the sixth drive gear.

7. The power transmission apparatus of claim 5, wherein the planetary gear set is a single pinion planetary gear set.

8. The power transmission apparatus of claim 1, further comprising:

five clutches each selectively connecting a corresponding pair among the first, second and third input shafts, the torque mediating shaft, and the first and second intermediate shafts; and a brake selectively connecting a corresponding shaft selected among the first, second and third input shafts, the torque mediating shaft, and the first and second intermediate shafts to the transmission housing.

9. The power transmission apparatus of claim 8, wherein the five clutches comprise:

an engine clutch arranged between an engine output shaft of the engine and a motor shaft of the motor/generator;

a first clutch arranged between the motor shaft and the first input shaft;

a second clutch arranged between the motor shaft and the second input shaft;

a third clutch arranged between the motor shaft and the third input shaft; and a fourth clutch arranged between the second intermediate shaft and the output shaft, wherein the brake is arranged between the second intermediate shaft and the transmission housing.

10. The power transmission apparatus of claim 1, wherein the second shifting section is disposed closer to the engine than the second, third, fourth, and fifth gear sets of the first shifting section.

* * * * *